United States Patent
Hikida

(10) Patent No.: US 10,731,294 B2
(45) Date of Patent: Aug. 4, 2020

(54) SHOE PRESS BELT

(71) Applicant: Yamauchi Corporation, Hirakata-shi, Osaka (JP)

(72) Inventor: Takahisa Hikida, Hirakata (JP)

(73) Assignee: Yamauchi Corporation, Hirakata-shi, Osaka (JP)

( * ) Notice: Subject to any disclaimer, the term of this patent is extended or adjusted under 35 U.S.C. 154(b) by 0 days.

(21) Appl. No.: 15/564,887

(22) PCT Filed: Apr. 5, 2016

(86) PCT No.: PCT/JP2016/061097
§ 371 (c)(1),
(2) Date: Oct. 6, 2017

(87) PCT Pub. No.: WO2016/163350
PCT Pub. Date: Oct. 13, 2016

(65) Prior Publication Data
US 2018/0094385 A1    Apr. 5, 2018

(30) Foreign Application Priority Data
Apr. 7, 2015   (JP) .................................. 2015-078495

(51) Int. Cl.
*D21F 3/00* (2006.01)
*C08G 18/44* (2006.01)
(Continued)

(52) U.S. Cl.
CPC .............. *D21F 3/0227* (2013.01); *D21F 3/00* (2013.01); *D21F 7/08* (2013.01); *C08G 18/44* (2013.01);
(Continued)

(58) Field of Classification Search
CPC . D21F 3/0227; D21F 3/00; D21F 7/08; D21F 3/029; D21F 3/086; Y10S 162/901;
(Continued)

(56) References Cited

U.S. PATENT DOCUMENTS 4,855,377 A    8/1989  Yokota et al.
6,296,738 B1 * 10/2001  Ishii ...................... D21F 3/0227
                                                      162/358.4
(Continued)

FOREIGN PATENT DOCUMENTS

CA    2716520 A1 *  8/2009  ............. C08G 18/10
CN    101939483 A    1/2011
(Continued)

OTHER PUBLICATIONS

Machine translation of WO-2013/122812 (Year: 2013).*
(Continued)

*Primary Examiner* — Jose A Fortuna
(74) *Attorney, Agent, or Firm* — Sughrue Mion, PLLC

(57) ABSTRACT

A shoe press belt includes a polyurethane in which a reinforcement base member is embedded, the polyurethane being in one piece with the reinforcement base member. The polyurethane constituting at least an outer circumferential surface of the shoe press belt is a thermosetting polyurethane obtained by curing an urethane prepolymer using a curing agent. The urethane prepolymer includes a first urethane prepolymer (A) obtained by a reaction between an aromatic diisocyanate and a polyol component containing an aliphatic polycarbonatediol represented by a chemical formula (1). In the chemical formula (1), m is a combination of two or more of integers of not less than 2 and not more than 12, and n is not less than 3 and not more than 33.

(Continued)

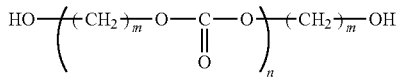

3 Claims, 1 Drawing Sheet

(51) Int. Cl.
C08G 18/48 (2006.01)
D21F 3/02 (2006.01)
D21F 7/08 (2006.01)
C08J 5/04 (2006.01)

(52) U.S. Cl.
CPC ........... *C08G 18/4854* (2013.01); *C08J 5/046* (2013.01); *C08J 2375/04* (2013.01)

(58) Field of Classification Search
CPC .. C08G 18/4854; C08G 18/44; C08J 2375/04; C08J 5/046
See application file for complete search history.

(56) References Cited

U.S. PATENT DOCUMENTS

| | | | | |
|---|---|---|---|---|
| 7,943,013 | B2 * | 5/2011 | Yazaki | C08G 18/10 |
| | | | | 162/358.1 |
| 9,777,433 | B2 * | 10/2017 | Takamori | D21F 3/029 |
| 10,036,120 | B2 * | 7/2018 | Takamori | C08G 18/10 |
| 10,480,121 | B2 * | 11/2019 | Nakai | D06N 3/14 |
| 2003/0176622 | A1 | 9/2003 | Konishi et al. | |
| 2004/0014383 | A1 * | 1/2004 | Ishino | B29C 67/246 |
| | | | | 442/59 |
| 2004/0029474 | A1 * | 2/2004 | Watanabe | C08G 18/10 |
| | | | | 442/181 |
| 2004/0092699 | A1 | 5/2004 | Ueno et al. | |
| 2004/0112561 | A1 * | 6/2004 | Watanabe | D21F 3/0227 |
| | | | | 162/358.3 |
| 2005/0139341 | A1 * | 6/2005 | Watanabe | D21F 3/0227 |
| | | | | 162/358.4 |
| 2005/0287373 | A1 * | 12/2005 | Ishino | D21F 3/0227 |
| | | | | 428/423.1 |
| 2007/0023156 | A1 | 2/2007 | Hikita et al. | |
| 2008/0146766 | A1 | 6/2008 | Masubuchi et al. | |
| 2010/0261852 | A1 | 10/2010 | Masubuchi et al. | |
| 2010/0314067 | A1 | 12/2010 | Yazaki et al. | |
| 2012/0132384 | A1 * | 5/2012 | Hagfors | C08G 18/10 |
| | | | | 162/358.2 |
| 2014/0352904 | A1 * | 12/2014 | Singh | C08G 18/4854 |
| | | | | 162/164.6 |
| 2015/0211177 | A1 * | 7/2015 | Delmas | D21F 3/0227 |
| | | | | 162/358.2 |
| 2015/0308044 | A1 | 10/2015 | Delmas et al. | |
| 2016/0355978 | A1 * | 12/2016 | Takamori | D21F 3/029 |
| 2017/0218568 | A1 * | 8/2017 | Takamori | C08G 18/10 |
| 2018/0094385 | A1 * | 4/2018 | Hikida | D21F 3/00 |

FOREIGN PATENT DOCUMENTS

| | | | | |
|---|---|---|---|---|
| CN | 102264786 A | | 11/2011 | |
| CN | 103842585 A | | 6/2014 | |
| DE | 10 2011 079 893 A1 | | 1/2013 | |
| EP | 0302712 A2 | * | 2/1989 | ............ C08G 18/44 |
| EP | 1382737 A1 | * | 1/2004 | .......... D21F 3/0227 |
| EP | 1507042 A1 | * | 2/2005 | .......... D21F 3/0227 |
| EP | 2169112 A1 | | 3/2010 | |
| EP | 2248944 A1 | | 11/2010 | |
| EP | 3282052 A1 | * | 2/2018 | ............... D21F 3/00 |
| JP | 2-289616 A | | 11/1990 | |
| JP | 02289616 A | * | 11/1990 | |
| JP | 4-007327 A | | 1/1992 | |
| JP | 04072327 A | * | 3/1992 | |
| JP | 5-051428 A | | 3/1993 | |
| JP | 5-029648 B2 | | 5/1993 | |
| JP | 2002-146694 A | | 5/2002 | |
| JP | 2005-097806 A | | 4/2005 | |
| JP | 2012-511611 A | | 5/2012 | |
| JP | 2016199813 A | * | 12/2016 | ............... D21F 3/00 |
| WO | 01/090213 A1 | | 11/2001 | |
| WO | 02/070584 A1 | | 9/2002 | |
| WO | 2006/088152 A1 | | 8/2006 | |
| WO | 2009/063767 A1 | | 5/2009 | |
| WO | 2009/099114 A1 | | 8/2009 | |
| WO | WO-2009099114 A1 | * | 8/2009 | ............ C08G 18/10 |
| WO | 2010/066950 A2 | | 6/2010 | |
| WO | WO-2010066950 A2 | * | 6/2010 | ............ C08G 18/10 |
| WO | 2013/013891 A1 | | 1/2013 | |
| WO | 2013/122812 A1 | | 8/2013 | |
| WO | 2014/086650 A1 | | 6/2014 | |
| WO | WO-2016163350 A1 | * | 10/2016 | ............... D21F 3/00 |

OTHER PUBLICATIONS

Communication dated Sep. 25, 2018, issued by the State Intellectual Property Office of the P.R.C. in corresponding Chinese Application No. 201680029240.1.
International Search Report for PCT/JP2016/061097 dated Jun. 28, 2016 [PCT/ISA/210].
Written Opinion for PCT/JP2016/061097 dated Jun. 28, 2016 [PCT/ISA/237].
Communication dated Nov. 21, 2018 from the European Patent Office in counterpart application No. 16776516.3.
Communication dated Feb. 28, 2018, from the European Patent Office in counterpart European Application No. 16776516.3.
Communication dated Jun. 26, 2019 from the China National Intellectual Property of Administration in counterpart Application No. 201680029240.1.
Communication dated Feb. 18, 2020, from the European Patent Office in European Application No. 16776516.3.
Curran Associates, Inc. "Polyurethanes Technical Conference 2008", American Chemistry Council, Sep. 28-30, 2008, San Antonio, Texas, vol. 1, pp. 1-10 (10 pages total).
Mutsuhisa Furukawa et al., "Microphase-Separated Structure and Mechanical Properties of Novel Poly(carbonate)-Based Polyurethanes", 2009, p. 295-302 (8 pages total).

* cited by examiner

SHOE PRESS BELT

CROSS REFERENCE TO RELATED APPLICATIONS

This application is a National Stage of International Application No. PCT/JP2016/061097 filed Apr. 5, 2016, claiming priority based on Japanese Patent Application No. 2015-078495 filed Apr. 7, 2015, the contents of all of which are incorporated herein by reference in their entirety.

TECHNICAL FIELD

The present invention relates to a shoe press belt, particularly, a polyurethane constituting at least an outer circumferential surface of the shoe press belt.

BACKGROUND ART

In recent years, in order to increase an effect of dewatering a wet paper web in a press part of a paper-making process, the following method (so-called "shoe press") has been widely used: one surface of the wet paper web disposed on a felt traveling at a high speed is pressed by a press roll and the other surface of the wet paper web is pressed by a pressure applying shoe with an endless belt interposed therebetween, thereby dewatering the wet paper web. In the shoe press, the endless belt (hereinafter, also referred to as "elastic belt"), in which a reinforcement base member is in one piece with a thermosetting polyurethane, has been conventionally used. The elastic belt for the press part normally has an outer circumferential surface provided with a multiplicity of drainage grooves along the circumferential direction. Moreover, in recent years, use of such shoe press and elastic belt has been considered for a calender process in which a surface of paper is smoothened to provide luster. Further, particularly in the paper making at a high speed, a sheet transfer elastic belt for preventing cut of paper and stably transferring the wet paper web may be also nipped in the shoe press.

In the shoe press, the belt is severely bent and pressed repeatedly between the press roll and the pressure applying shoe. Such an elastic belt is replaced due to, for example, occurrence of cracks and reduction of the volume, i.e., VV (void volume) of the drainage grooves. Japanese Patent Laying-Open No. 2002-146694 (Patent Document 1), Japanese Patent Laying-Open No. 2005-097806 (Patent Document 2), or the like proposes a method of preventing occurrence of cracks. Patent Document 1 discloses a shoe press belt in which a polyurethane constituting the outer circumferential surface of the shoe press belt is constituted of a composition including an urethane prepolymer having an isocyanate group at its terminal and a curing agent containing dimethylthiotoluenediamine. Patent Document 2 discloses to reduce a belt thickness of a shoe press belt at regions, which correspond to respective ends of a pressure applying shoe in the width direction and in which cracks are likely to be generated, as compared with a belt thickness of the central region of the shoe press belt. By using such a method, occurrence of cracks due to short-time use can be prevented. Therefore, based on a degree of reduction of the VV of the drainage grooves, the elastic belt can be replaced as planned.

CITATION LIST

Patent Document

PTD 1: Japanese Patent Laying-Open No. 2002-146694
PTD 2: Japanese Patent Laying-Open No. 2005-097806

SUMMARY OF INVENTION

Technical Problem

In recent years, there has been proposed a device capable of performing shoe press at a high speed under a high nip pressure. It has been found that when the elastic belt is used in such a device, the elastic belt is compressed a larger number of times per unit time and is fed with a larger load, with the result that a land is collapsed or chipped in a short time. The "land" means a portion that is located between adjacent drainage grooves in the outer circumferential surface of the elastic belt and that is provided with no drainage groove. When the collapse or chipping of the land becomes noticeable, dewatering becomes unstable or a mark appears on the paper, with the result that the elastic belt needs to be replaced. Therefore, it is necessary to prevent the land from being collapsed and chipped in the belt to be used in the device capable of performing shoe press at a high speed under a high nip pressure. In order to prevent the land from being collapsed and chipped, the thermosetting polyurethane preferably has a high restorability after compression, i.e., the thermosetting polyurethane constituting the outer circumferential surface of the elastic belt preferably has a small compression set.

Moreover, the outer circumferential surface of the elastic belt is exposed to a solution including various chemicals for a long time and is fed with a load due to compression. Accordingly, the outer circumferential surface of the elastic belt is more likely to be deteriorated and hydrolyzed. Therefore, it is necessary to prevent the deterioration of the outer circumferential surface of the elastic belt. In other words, it is necessary to improve hydrolysis resistance of the thermosetting polyurethane constituting the outer circumferential surface of the elastic belt.

Examples of the thermosetting polyurethane satisfying the above-described two requirements (i.e., the improvement of the compression set resistance and the improvement of the hydrolysis resistance) include a thermosetting polyurethane obtained by curing, using 1,4-butanediol as a curing agent, an urethane prepolymer obtained by a reaction between an aromatic diisocyanate and an aliphatic polycarbonatediol (PCD) serving as a polyol component. Therefore, the outer circumferential surface of the elastic belt may be constituted of such a thermosetting polyurethane. In this case, a C6-based PCD has been used as the PCD. Here, the C6-based PCD is typically a PCD (C6 homo-type PCD) obtained by a reaction between 1,6-hexanediol and a carbonate. However, the C6-based PCD includes not only the C6 homo-type PCD but also a PCD (C6 copolymerization type PCD) obtained by reaction and copolymerization among 1,6-hexanediol, a C6 type polyetherdiol, and a carbonate.

When an elastic belt (conventional elastic belt) having an outer circumferential surface constituted of the thermosetting polyurethane obtained by curing, using 1,4-butanediol, the urethane prepolymer obtained by the reaction between the PCD and the aromatic diisocyanate is used in the shoe press device involving the high speed and high nip pressure, it is possible to prevent the collapse and chipping of the land.

However, it has been found that when the outer circumferential surface of the elastic belt is scratched due to some reason, a crack is generated from the scratch and is developed to be a very long crack in a short time. Thus, in the conventional elastic belt, it was found very difficult to prevent both the collapse and chipping of the land and the occurrence and development of the crack.

The present invention has been made in view of such a circumstance and has an object to prevent both collapse and chipping of a land and occurrence and development of a crack.

Solution to Problem

A shoe press belt of the present invention includes a polyurethane in which a reinforcement base member is embedded, the polyurethane being in one piece with the reinforcement base member. The polyurethane constituting at least an outer circumferential surface of the shoe press belt is a thermosetting polyurethane obtained by curing an urethane prepolymer using a curing agent. The urethane prepolymer includes a first urethane prepolymer (A) obtained by a reaction between an aromatic diisocyanate and a polyol component containing an aliphatic polycarbonatediol represented by the following chemical formula (1):

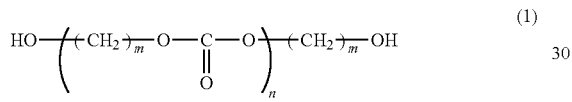
(1)

In the chemical formula (1), m is a combination of two or more of integers of not less than 2 and not more than 12, is preferably a combination of two or more of integers of not less than 2 and not more than 6, and is more preferably a combination of 5 and 6. In the chemical formula (1), n represents a number average degree of polymerization, and is not less than 3 and not more than 33.

Here, the expression "m is a combination of two or more of integers of not less than 2 and not more than 12" means that the polymer portion of the chemical formula (1) includes two or more types of constitutional units (—(CH$_2$)$_m$—O—COO—) having different m. In the chemical formula (1), the m at the right end is the same integer as one of m in the polymer portion. The same applies to the expressions "m is a combination of two or more of integers of not less than 2 and not more than 6" and "m is a combination of 5 and 6". For example, the expression "m is a combination of 5 and 6" means that the polymer portion of the chemical formula (1) includes: a constitutional unit (—(CH$_2$)$_5$—O—COO—) in which m is 5; and a constitutional unit (—(CH$_2$)$_6$—O—COO—) in which m is 6.

In other words, the thermosetting polyurethane of the present invention includes: a constitutional unit originating from the urethane prepolymer; and a constitutional unit originating from the curing agent. The constitutional unit originating from the urethane prepolymer includes: a constitutional unit originating from the aliphatic polycarbonatediol represented by the chemical formula (1); and a constitutional unit originating from the aromatic diisocyanate. It should be noted that the "constitutional unit originating from the urethane prepolymer" means a chemical structure of the urethane prepolymer after the reaction between the urethane prepolymer of the present invention and the curing agent of the present invention. The same applies to the "constitutional unit originating from the curing agent". Moreover, the "constitutional unit originating from the aliphatic polycarbonatediol represented by the chemical formula (1)" means a chemical structure of the aliphatic polycarbonatediol after the reaction between the aromatic diisocyanate and the aliphatic polycarbonatediol represented by the above-described chemical formula (1). The same applies to the "constitutional unit originating from the aromatic diisocyanate".

Preferably, the aliphatic polycarbonatediol is obtained by a reaction between a carbonate and a mixture of 1,5-pentanediol and 1,6-hexanediol. Preferably, the aliphatic polycarbonatediol has a number average molecular weight of not less than 1000 and not more than 3000.

The aromatic diisocyanate is preferably at least one of diphenyl methane diisocyanate (MDI) and 1,4-phenylene diisocyanate (PPDI). In this case, the curing agent is preferably 1,4-butanediol.

The urethane prepolymer may be a mixture of two or more types of urethane prepolymers having different compositions, and in that case, the urethane prepolymer preferably contains not less than 50 mass % of the first urethane prepolymer (A).

When the shoe press belt of the present invention is used in a press part of a paper-making process, a drainage groove is preferably formed in the outer circumferential surface of the shoe press belt of the present invention.

Advantageous Effects of Invention

In the present invention, collapse and chipping of a land can be prevented, and occurrence and development of a crack can be prevented.

DESCRIPTION OF EMBODIMENTS

Figure 1:
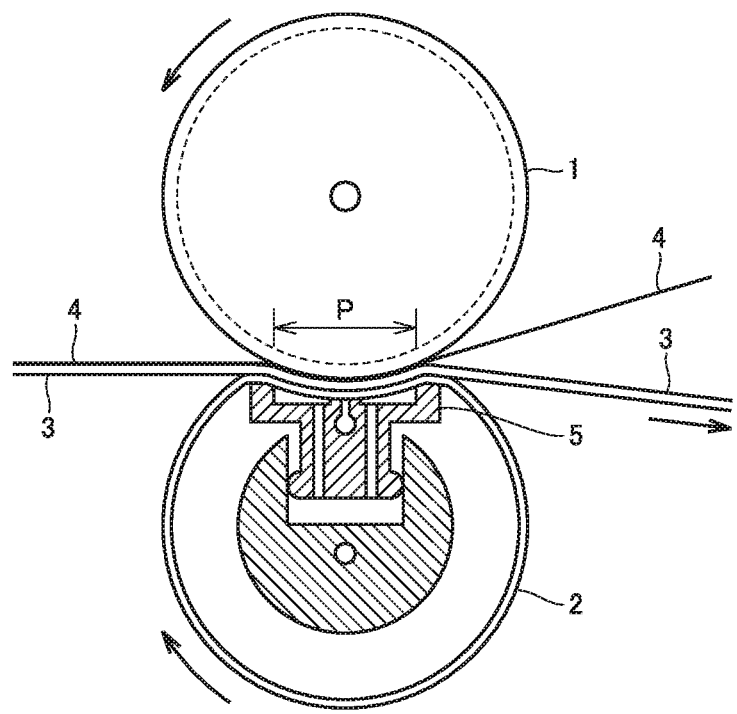
FIG. 1 is an explanatory diagram illustrating a shoe press device.

Hereinafter, the present invention will be described with reference to figures. It should be noted that the same reference characters represent the same or corresponding portions in the figures of the present invention. A dimensional relation such as a length, a width, a thickness, or a depth is modified as appropriate for clarity and brevity of the drawings and does not represent an actual dimensional relation.

[Shoe Press Device]

FIG. 1 shows an exemplary shoe press device used for a press part in a paper-making process. In FIG. 1, a flexible, cylindrical shoe press belt 2 is provided below a press roll 1. Between shoe press belt 2 and press roll 1, a felt 3 and a wet paper web 4 pass. The outer circumferential surface of shoe press belt 2 is in direct contact with felt 3. A pressure applying shoe 5 is pressed against the inner circumferential surface of shoe press belt 2 toward the press roll 1 side. Lubricating oil is supplied between pressure applying shoe 5 and shoe press belt 2 to allow shoe press belt 2 to travel smoothly. Shoe press belt 2 slides and travels on pressure applying shoe 5 with a friction with felt 3. The surface of pressure applying shoe 5 has a recess shape corresponding to the surface of press roll 1. Between press roll 1 and pressure applying shoe 5, a pressure-applying/dewatering portion P having a wide width is formed. At this pressure-applying/dewatering portion P, wet paper web 4 is dewatered.

[Shoe Press Belt]

Figure 2:
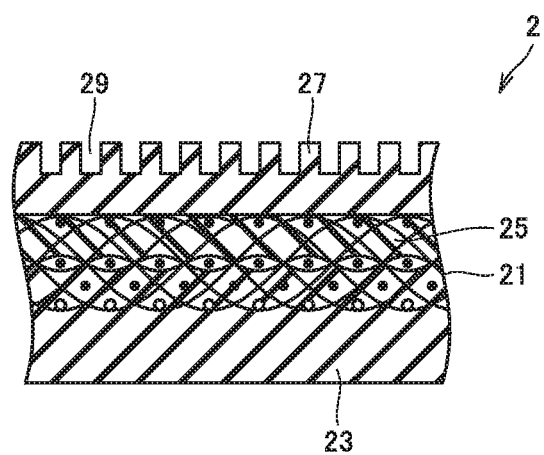
FIG. 2 is a partial cross sectional view showing an exemplary shoe press belt of the present invention.

FIG. 2 shows an exemplary shoe press belt 2. Shoe press belt 2 shown in FIG. 2 includes: a base fabric 21 (an exemplary reinforcement base member) constituted of a multiple fabric; an inner polyurethane layer 23 and an intermediate polyurethane layer 25 with which the both surfaces of basic fabric 21 are impregnated and covered; and a polyurethane layer (hereinafter, referred to as "outermost circumferential polyurethane layer") 27 provided outwardly of intermediate polyurethane layer 25 and constituting the outer circumferential surface of shoe press belt 2.

Since both the surfaces of base fabric 21 are impregnated and covered with inner polyurethane layer 23 and intermediate polyurethane layer 25, an adhesion surface between inner polyurethane layer 23 and intermediate polyurethane layer 25 is located inside base fabric 21, whereby base fabric 21 is in one piece with inner polyurethane layer 23 and intermediate polyurethane layer 25.

Outermost circumferential polyurethane layer 27 covers intermediate polyurethane layer 25, is accordingly in one piece with intermediate polyurethane layer 25, and is therefore in one piece with base fabric 21 with intermediate polyurethane layer 25 being interposed therebetween. Outermost circumferential polyurethane layer 27 has a surface provided with a multiplicity of drainage grooves 29 formed along the traveling direction, thereby increasing dewatering efficiency.

The configuration of the shoe press belt of the present invention is not limited to shoe press belt 2 shown in FIG. 2. For example, one or more polyurethane layers may be further provided between intermediate polyurethane layer 25 and outermost circumferential polyurethane layer 27. Moreover, the position of an interface between intermediate polyurethane layer 25 and outermost circumferential polyurethane layer 27 coincides with the surface of base fabric 21 in FIG. 2, but may be shifted to the inner polyurethane layer 23 side or the outermost circumferential polyurethane layer 27 side relative to the surface of base fabric 21.

Moreover, the shoe press belt of the present invention may be configured such that base fabric 21 is impregnated and covered with a single polyurethane layer or such that base fabric 21 is impregnated and covered with two polyurethane layers. In each of the cases, base fabric 21 and the polyurethane layer(s) are in one piece, thus constituting the shoe press belt.

Moreover, the reinforcement base member of shoe press belt 2 is not limited to base fabric 21, and may be a base fabric, reinforcing yarns, a mesh object, or a combination thereof. For the configuration and material of the reinforcement base member, the configuration and material of a member included in the conventional shoe press belt as a reinforcement base member can be used without particular limitations. The polyurethane thus constituting at least the outer circumferential surface of shoe press belt 2 is constituted of a composition including a thermosetting polyurethane described below.

[Thermosetting Polyurethane]

The thermosetting polyurethane of the present invention is obtained by curing an urethane prepolymer using a curing agent. Such an urethane prepolymer includes a first urethane prepolymer (A) obtained by a reaction between aromatic diisocyanate and a polyol component containing an aliphatic polycarbonatediol indicated by the following chemical formula (1):

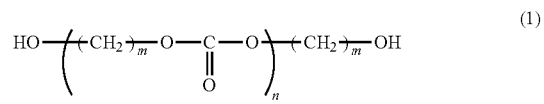

In the chemical formula (1), m is a combination of two or more of integers of not less than 2 and not more than 12. In the chemical formula (1), n represents a number average degree of polymerization, and is not less than 3 and not more than 33.

In the thermosetting polyurethane of the present invention, a compression set resistance can be increased. Therefore, when at least the outer circumferential surface of the shoe press belt is constituted of the composition including the thermosetting polyurethane of the present invention, a land can be prevented from being collapsed and chipped. Moreover, even if the outer circumferential surface constituted of the composition including the thermosetting polyurethane of the present invention is scratched due to some reason, a crack is unlikely to be generated from the scratch, thereby preventing occurrence and development of the crack. These effects are also attained when the shoe press belt having at least the outer circumferential surface constituted of the composition including the thermosetting polyurethane of the present invention is used in a device capable of performing shoe press at a high speed under a high nip pressure.

Moreover, in the present invention, the thermosetting polyurethane is synthesized by curing the urethane prepolymer using the curing agent. Accordingly, a large-sized resin molded product such as the shoe press belt can be manufactured more stably as compared with a case where the thermosetting polyurethane of the present invention is synthesized using a one-shot method.

For the method of synthesizing the thermosetting polyurethane of the present invention, a conventionally known method of synthesizing a thermosetting polyurethane by curing an urethane prepolymer using a curing agent can be used without particular limitations.

The thermosetting polyurethane of the present invention preferably has a Shore A hardness of not less than 91 and not more than 97. The lower limit value of the Shore A hardness is more preferably 93, and the upper limit value of the Shore A hardness is more preferably 95. When the Shore A hardness of the thermosetting polyurethane of the present invention is not more than 90, the compression set resistance may be deteriorated. On the other hand, when the Shore A hardness of the thermosetting polyurethane of the present invention is not less than 98, deterioration of crack resistance is concerned. When the Shore A hardness of the thermosetting polyurethane of the present invention is not less than 91 (more preferably, not less than 93), the compression set resistance is excellent and a sufficient retention ratio of the VV of the drainage grooves can be secured. When the Shore A hardness of the thermosetting polyurethane of the present invention is not more than 97 (preferably, not more than 95), performance in preventing occurrence and development of a crack becomes particularly excellent. In the present specification, the Shore A hardness means a hardness measured in accordance with a method described in JIS K 6253-3: 2012.

<Urethane Prepolymer>

The urethane prepolymer of the present invention includes a first urethane prepolymer (A) obtained by a reaction between an aromatic diisocyanate and a polyol component containing an aliphatic polycarbonatediol represented by the above-described chemical formula (1). The urethane prepolymer of the present invention may consist only of the first urethane prepolymer (A). Moreover, the urethane prepolymer of the present invention may be a mixture of two or more types of urethane prepolymers having different compositions. In that case, the urethane prepolymer of the present invention preferably includes not less than 50 mass % of the first urethane prepolymer (A). As the method of synthesizing the urethane prepolymer of the present invention, a conventionally known method of synthesizing an urethane prepolymer can be used without particular limitations.

(Aliphatic Polycarbonatediol)

In the above-described chemical formula (1), m is a combination of two or more of integers of not less than 2 and not more than 12. In other words, the aliphatic polycarbonatediol of the present invention is not a homo-type PCD in which m is one integer, but is a hetero-type copolymerization-based PCD. Accordingly, the present inventor considers that the above-described effects (the prevention of the collapse and chipping of the land and the prevention of the occurrence and development of the crack) can be obtained in the shoe press belt of the present invention. The present inventor considers that this is presumably due to the following reason.

It has been known that a polyurethane employing a PCD as a polyol component is excellent in hydrolysis resistance but exhibits a high crystallinity. Therefore, a shoe press belt having an outer circumferential surface constituted of such a polyurethane employing a PCD as a polyol component can prevent collapse and chipping of a land, but is inferior in crack resistance, disadvantageously.

However, when using the hetero-type copolymerization-based PCD as the polyol component, there occurs an irregularity in the main chain of the aliphatic polycarbonatediol. Accordingly, crystallinity is relaxed in the polyurethane employing the hetero-type copolymerization-based PCD as the polyol component, thereby obtaining flexibility in terms of chemistry. Therefore, the crack resistance is improved when the outer circumferential surface of the shoe press belt is constituted of such a polyurethane. Hence, when the outer circumferential surface of the shoe press belt is constituted of the polyurethane employing the hetero-type copolymerization-based PCD as the polyol component, the crack resistance can be improved while maintaining high hydrolysis resistance. The present inventor thinks so.

The number average molecular weight of the aliphatic polycarbonatediol of the present invention is preferably not less than 1000 and not more than 3000, and is more preferably not less than 1000 and not more than 2000. When the number average molecular weight of the aliphatic polycarbonatediol of the present invention is not less than 1000 and not more than 2000, the compression set resistance of the thermosetting polyurethane of the present invention can be increased further, thereby remarkably preventing collapse and chipping of the land and remarkably preventing occurrence and development of the crack.

It should be noted that in the present invention, a mixture of aliphatic polycarbonatediols having different number average molecular weights may be employed. In the present specification, the number average molecular weight of the aliphatic polycarbonatediol means the number average molecular weight measured in accordance with a Gel Permeation Chromatography method.

The aliphatic polycarbonatediol of the present invention can be obtained by an esterification reaction between a carbonate and a mixture of two or more types of hydrocarbondiols each having a carbon number of not less than 2 and not more than 12 and having different carbon numbers. As the method of synthesizing the aliphatic polycarbonatediol of the present invention, a conventionally known method of synthesizing an aliphatic polycarbonatediol can be used without particular limitations. For example, Japanese Patent Laying-Open No. 2-289616 discloses an exemplary method of synthesizing an aliphatic copolycarbonatediol.

The mixture of the two or more types of hydrocarbondiols having different carbon numbers preferably includes two or more types of chain hydrocarbondiols having carbon numbers of not less than 2 and not more than 12, more preferably includes two or more types of chain hydrocarbondiols having carbon numbers of not less than 2 and not more than 6, and further preferably includes chain hydrocarbondiols having carbon numbers of 5 and 6. For example, the mixture of the two or more types of hydrocarbondiols having different carbon numbers is preferably a mixture of 1,5-pentanediol and 1,6-hexanediol. When the mixture of 1,5-pentanediol and 1,6-hexanediol is used as the mixture of the two or more types of hydrocarbondiols having different carbon numbers, a C5/C6 copolymerization-based PCD is obtained.

A blending ratio of the two or more types of hydrocarbondiols having different carbon numbers in the mixture is not particularly limited. In a mixture of two types of hydrocarbondiols having different carbon numbers, the hydrocarbondiols are preferably blended at a molar ratio of 1:9 to 9:1, and are more preferably blended at a molar ratio of 4:6 to 6:4. Most preferably, the hydrocarbondiols are a mixture of 1,5-pentanediol and 1,6-hexanediol, and they are blended at a molar ratio of 4:6 to 6:4.

The carbonate of the present invention is not limited particularly as long as it has an ester bond in its molecule, but is preferably ethylene carbonate, dimethyl carbonate, diethyl carbonate, or diphenyl carbonate.

(Aromatic Diisocyanate)

The aromatic diisocyanate of the present invention is not limited as long as it has an aromatic ring and two NCO groups in its molecule, but is preferably diphenyl methane diisocyanate (MDI (methylene diphenyl diisocyanate)), 1,4-phenylene diisocyanate (PPDI (p-phenylene diisocyanate)), toluene diisocyanate (TDI), or the like.

<Curing Agent>

The curing agent of the present invention is not limited particularly as long as it is a compound having a functional group that can react with the NCO group included in the urethane prepolymer of the present invention, and may be any one of a short-chain diol, a polyol, an aromatic diol, and an aromatic diamine. One type of curing agent may be used or a plural types of curing agents may be used together. Particularly, when the aromatic diisocyanate is MDI or PPDI, the curing agent is preferably 1,4-butanediol (1,4-BD (butanediol)). When the aromatic diisocyanate is TDI, the curing agent is preferably 4,4'-methylene-bis-(2-chloroaniline) (MOCA), dimethyl thio-toluene diamine (DMTDA), diethyl toluene diamine (DETDA), or the like. When the mixture of the first urethane prepolymer (A) and the one or more types of urethane prepolymers having compositions different from that of the first urethane prepolymer (A) are used as the urethane prepolymer, at least one of a short-chain diol, a polyol, an aromatic diol, and an aromatic diamine can be used as the curing agent.

EXAMPLES

Hereinafter, the present invention will be described more in detail with reference to Examples, but is not limited to the description below.

Table 1 shows first to fourth urethane prepolymers used in Examples 1 to 3.

TABLE 1

| | Urethane Prepolymer Material | | | |
|---|---|---|---|---|
| | Aliphatic Polycarbonatediol | | Aromatic | NCO % |
| | Material | Mn | Diisocyanate | (Mass %) |
| First Urethane Prepolymer | C5/C6 Copolymerization-based PCD (1) | 1000 | MDI | 9.80 |
| Second Urethane Prepolymer | C5/C6 Copolymerization-based PCD (2) | 2000 | MDI | 6.40 |
| Third Urethane Prepolymer | C5/C6 Copolymerization-based PCD (2) | 2000 | MDI | 8.35 |
| Fourth Urethane Prepolymer | C5/C6 Copolymerization-based PCD (2) | 2000 | MDI | 10.29 |

In Table 1, each of the aliphatic polycarbonatediols is a hetero-type copolymerization-based PCD obtained by a reaction between a carbonate and a mixture of 1,5-pentanediol and 1,6-hexanediol, and is denoted as "C5/C6 copolymerization-based PCD (1)" or "C5/C6 copolymerization-based PCD (2)". In each of the aliphatic polycarbonatediols, the molar ratio of 1,5-pentanediol and 1,6-hexanediol is 1:1.

For the first urethane prepolymer, an aliphatic polycarbonatediol having a number average molecular weight (indicated as "Mn" in Table 1 and Table 2) of 1000 is used. For each of the second to fourth urethane prepolymers, an aliphatic polycarbonatediol having a number average molecular weight of 2000 is used.

In each of the urethane prepolymers, MDI is used as the aromatic diisocyanate. Moreover, in each of the urethane prepolymers, by adjusting the blending ratio of the MDI to the aliphatic polycarbonatediol, NCO % shown in Table 1 is exhibited.

Table 2 shows a composition of the material to serve as the outermost circumferential polyurethane layer in each of Examples and Comparative Examples.

TABLE 2

| | Thermosetting Polyurethane Constituting Outermost Circumferential Polyurethane Layer | | | | | | | | | |
|---|---|---|---|---|---|---|---|---|---|---|
| | Material | | | | | | | | | |
| | Urethane Prepolymer | | | | | Curing Agent | | | | |
| | Material | | | NCO % | Blending Amount | | | Blending Amount | | Shore A |
| | Polyol Component | | Aromatic | | (parts by | | Equivalent | (parts by | | |
| | Composition | Mn | Diisocyanate | (mass %) | mass) | Material | Value | mass) | α Value | Hardness |
| Example 1 | C5/C6 Copolymerization-based PCD (First Urethane Prepolymer):(Second Urethane Prepolymer) = 70:30 | 1300 | MDI | 8.80 | 100 | 1,4-BD | 45.06 | 9.4 | 1.00 | 95 |
| Example 2 | C5/C6 Copolymerization-based PCD (Third Urethane Prepolymer):(Fourth Urethane Prepolymer) = 60:40 | 2000 | MDI | 9.13 | 100 | 1,4-BD | 45.06 | 9.8 | 1.00 | 95 |
| Example 3 | C5/C6 Copolymerization-basea PCD (Third Urethane Prepolymer) = 100 | 2000 | MDI | 8.35 | 100 | 1,4-BD | 45.06 | 9.0 | 1.00 | 93 |
| Comparative Example 1 | PTMG | | TDI | 6.40 | 100 | DMTDA | 107 | 17.6 | 1.08 | 95 |
| Comparative Example 2 | C6 Copolymerization-based PCD | | MDI | 10.00 | 100 | 1,4-BD | 45.06 | 10.7 | 1.00 | 95 |
| Comparative Example 3 | PTMG | | TDI | 5.77 | 100 | DMTDA | 107 | 15.9 | 1.08 | 93 |
| Comparative Example 4 | C6 Homo-Type PCD | | TDI | 8.66 | 100 | DMTDA | 107 | 22.1 | 1.00 | 97 |

Example 1

(Preparation of Material to Serve as Outermost Circumferential Polyurethane Layer)

The first urethane prepolymer and the second urethane prepolymer were mixed at 80° C. at the following ratio:

(first urethane prepolymer):(second urethane prepolymer)=70:30(mass ratio).

100 parts by mass of the obtained mixture was mixed with 9.4 parts by mass of 1,4-BD (trademark "1,4-butanediol" provided by Mitsubishi Chemical Corporation; liquid temperature of 30° C.) serving as the curing agent (OH group/NCO group ($\alpha$ value)=1.00). In this way, the material to serve as the outermost circumferential polyurethane layer was prepared.

(Production of Shoe Press Belt)

First, there was prepared a base fabric having a thickness of 2.5 mm and constituted of a fabric quadruple-woven longitudinally and double-woven laterally.

Next, the inner polyurethane layer was produced. Specifically, the trademark "HIPRENE L-100" (Mitsui Chemicals, Inc; NCO %=4.2) and the trademark "HIPRENE L-167" (Mitsui Chemicals, Inc; NCO %=6.4) were mixed at a mass ratio of 30:70, thereby preparing an urethane prepolymer. It should be noted that each of "HIPRENE L-100" and "HIPRENE L-167" included polytetramethylene ether glycol (PTMG) as a polyol component, and included TDI as the aromatic isocyanate. 100 parts by mass of this urethane prepolymer (NCO %=5.77) and 15.9 parts by mass of DMTDA (trademark "ETHACURE 300" provided by Albemarle) serving as the curing agent were defoamed individually and then were mixed. In this way, the material to serve as the inner polyurethane layer was prepared. The surface of the base fabric was coated with the prepared material (material to serve as the inner polyurethane layer), and was heated for 8 hours at a temperature condition of 120° C. Accordingly, the base fabric was coated with the polyurethane, and was impregnated with the polyurethane up to 50% of the thickness of the base fabric.

Next, the polyurethane coating the base fabric was cut and polished. Accordingly, the thickness of the polyurethane from the front surface of the base fabric (corresponding to the thickness of the inner polyurethane layer) became 1.0 mm. The base fabric was reversed such that the surface coated with the polyurethane was located at the inner side.

Next, as the intermediate polyurethane layer, the base fabric is impregnated with the same material as the material to serve as the inner polyurethane layer from the backside surface of the base fabric (surface opposite to the front surface of the base fabric) to the impregnation surface of the inner polyurethane layer, thus coating the backside surface of the base fabric. Then, the surface of the polyurethane was smoothened using a doctor blade such that the surface of the polyurethane coating the backside surface of the base fabric substantially coincides with the position of the backside surface of the base fabric.

Next, the intermediate polyurethane layer was coated with the material to serve as the outermost circumferential polyurethane layer (material prepared using the above-described preparation method), and they were heated for 16 hours at a temperature condition of 125° C. Accordingly, the inner polyurethane layer (thickness of 1.0 mm; Shore A hardness of 93), the intermediate polyurethane layer (thickness of 2.5 mm; Shore A hardness of 93), the outermost circumferential polyurethane layer (Shore A hardness of 95), and the base fabric were adhered to and were in one piece with one another.

Next, the surface of the outermost circumferential polyurethane layer was cut such that the thickness of the outermost circumferential polyurethane layer became 2.5 mm, and was polished. Then, a multiplicity of drainage grooves (width of 0.9 mm; depth of 1.0 mm; pitch of 2.54 mm) were formed in the surface of the outermost circumferential polyurethane layer along the travel direction. In this way, the shoe press belt was obtained.

Example 2

The third urethane prepolymer and the fourth urethane prepolymer were mixed at 80° C. at the following ratio:

(third urethane prepolymer):(fourth urethane prepolymer)=60:40(mass ratio).

100 parts by mass of the obtained mixture was mixed with 9.8 parts by mass of 1,4-BD used in Example 1 as the curing agent ($\alpha$ value=1.00). The material thus prepared was used to form the outermost circumferential polyurethane layer (Shore A hardness of 95). Regarding points other than these, the shoe press belt was produced in accordance with the method described in Example 1.

Example 3

100 parts by mass of the third urethane prepolymer (liquid temperature of 80° C.) was mixed with 9.0 parts by mass of 1,4-BD used in Example 1 as the curing agent ($\alpha$ value=1.00). The material thus prepared was used to form the outermost circumferential polyurethane layer (Shore A hardness of 93). Regarding points other than these, the shoe press belt was produced in accordance with the method described in Example 1.

Comparative Example 1

100 parts by mass of the urethane prepolymer ("HIPRENE L-167" described above; liquid temperature of 70° C.) was mixed with 17.6 parts by mass of DMTDA ("ETHACURE 300" described above; liquid temperature of 50° C.) serving as the curing agent ($NH_2$ group/NCO group ($\alpha$ value)=1.08). The material thus prepared was used to form the outermost circumferential polyurethane layer (Shore A hardness of 95). Regarding points other than these, the shoe press belt was produced in accordance with the method described in Example 1.

Comparative Example 2

10.7 parts by mass of 1,4-BD used in Example 1 as the curing agent was mixed with 100 parts by mass of an urethane prepolymer (trademark "PU0356" provided by Bayer; liquid temperature of 80° C.) composed of MDI and a C6 copolymerization-based PCD that is based on 1,6-hexanediol and a C6 type polyetherdiol (OH group/NCO group ($\alpha$ value)=1.00). The material thus prepared was used to form the outermost circumferential polyurethane layer (Shore A hardness of 95). Regarding points other than these, the shoe press belt was produced in accordance with the method described in Example 1.

Comparative Example 3

A material to serve as the outermost circumferential polyurethane layer was obtained in accordance with the same method as the method of preparing the material to serve as the inner polyurethane layer as used in Example 1. Specifically, the trademark "HIPRENE L-100" described above and the trademark "HIPRENE L-167" described above were mixed at 70° C. at a ratio of 30:70 (mass ratio), thereby obtaining an urethane prepolymer. 100 parts by mass of the obtained urethane prepolymer was mixed with 15.9 parts by mass of the above-described DMTDA (liquid temperature of 50° C.) serving as the curing agent ($NH_2$ group/NCO group ($\alpha$ value)=1.08). The material thus prepared was used to form the outermost circumferential polyurethane layer (Shore A hardness of 93). Regarding points other than these, the shoe press belt was produced in accordance with the method described in Example 1.

Comparative Example 4

100 parts by mass of an urethane prepolymer (liquid temperature of 80° C.) composed of TDI and a C6 homotype PCD based on 1,6-hexanediol was mixed with 22.1 parts by mass of the above-described DMTDA (liquid temperature of 50° C.) serving as the curing agent ($NH_2$ group/NCO group ($\alpha$ value)=1.00). The material thus prepared was used to form the outermost circumferential polyurethane layer (Shore A hardness of 97). Regarding points other than these, the shoe press belt was produced in accordance with the method described in Example 1.

<Evaluation of Hydrolysis Resistance: Tension Test>

Evaluations were made with regard to hydrolysis resistance of the thermosetting polyurethane constituting the outermost circumferential polyurethane layer of the shoe press belt of each of Examples 1 to 3 and Comparative Examples 1 to 4.

From each of the shoe press belts having respective outer circumferential surfaces provided with no drainage grooves, layers other than the outermost circumferential polyurethane layer were cut off. Then, there were produced a plurality of dumbbell-shaped specimens (type 3 dumbbell-shaped punched pieces (thickness of 1 mm)) described in JIS K 6251-2010 (Rubber, vulcanized or thermoplastics—Determination of tensile stress-strain properties). Based on the method described in JIS K 6251-2010, the tensile strength (process time of 0 hour) of each of the dumbbell-shaped specimens was measured.

Next, several ones of the plurality of dumbbell-shaped specimens were introduced into a saturation type super-accelerating life tester (trademark "PC-305III" provided by Hirayama Manufacturing Corporation) and were left therein at a saturated vapor temperature of 105° C. for 4 hours. After removing the dumbbell-shaped specimens from the saturation type super-accelerating life tester, the dumbbell-shaped specimens were naturally dried indoors for seven days. Then, in accordance with the above-described method, the tensile strength (process time of 4 hours) of each of the dumbbell-shaped specimens was measured, and the retention ratio of the fracture strength (process time of 4 hours) was determined in accordance with the following formula:

[Retention ratio of fracture strength(process time of 4 hours)](%)=[Tensile strength(process time of 4 hours)]/[Tensile strength(process time of 0 hour)]×100.

Remaining several ones of the plurality of dumbbell-shaped specimens were introduced into the above-described saturation type super-accelerating life tester, and were left therein at a saturated vapor temperature of 105° C. for 24 hours. Then, in accordance with the above-described method, the tensile strength (process time of 24 hours) of each of the dumbbell-shaped specimens was measured, and the retention ratio of the fracture strength (process time of 24 hours) was determined in accordance with the following formula:

[Retention ratio of fracture strength(process time of 24 hours)](%)=[Tensile strength(process time of 24 hours)]/[Tensile strength(process time of 0 hour)]×100.

Results are shown in Table 3. When there is no large difference between the retention ratio of the fracture strength (process time of 4 hours) and the retention ratio of the fracture strength (process time of 24 hours) and the retention ratio of the fracture strength (process time of 24 hours) is not less than 90%, it can be said that the thermosetting polyurethane constituting the outermost circumferential polyurethane layer of the shoe press belt is excellent in hydrolysis resistance.

TABLE 3

|  | Hydrolysis Resistance | | | | | | | |
|---|---|---|---|---|---|---|---|---|
|  | Tension Test Retention Ratio of Fracture Strength (%) Process Time (Hour) | | Abrasion Test Wear Amount ($mm^3$) Process Time (Hour) | | | Permanent Compression Strain Retention Ratio of VV of Grooves (%) | Occurrence of Crack the Number of Times of Bending (×10,000) | Development of Crack Crack Development Rate (mm/1,000 Times of Bending) |
|  | 4 | 24 | 0 | 4 | 24 |  |  |  |
| Example 1 | 97 | 95 | 44 | 39 | 39 | 86 | >500 | 0.3 |
| Example 2 | 100 | 95 | 52 | 51 | 51 | 87 | >500 | 0.1 |
| Example 3 | 105 | 96 | 45 | 45 | 47 | 84 | >500 | 0.1 |
| Comparative Example 1 | 81 | 38 | 55 | 59 | 92 | 74 | 192 | 0.5 |
| Comparative Example 2 | 103 | 94 | 55 | 52 | 49 | 87 | 111 | 1.0 |
| Comparative Example 3 | 90 | 41 | 42 | 44 | 68 | 71 | >500 | 0.4 |
| Comparative Example 4 | 95 | 90 | — | — | — | — | 100 | 3.0 |

<Evaluation of Hydrolysis Resistance: Abrasion Test>

An abrasion test was performed with respect to the thermosetting polyurethane constituting the outermost circumferential polyurethane layer of the shoe press belt of each of Examples 1 to 3 and Comparative Examples 1 to 3.

From each of the shoe press belts having the respective outer circumferential surfaces provided with no drainage grooves, a plurality of first specimens (diameter of 16 mm and thickness of 6.0 mm) were produced using a punch. A wear amount of each of the first specimens (process time of 0 hour) was measured using a DIN abrasion tester provided by Toyo Seiki Seisaku-sho, Ltd (test load of 10N; traveling distance of 40 m).

Next, several ones of the plurality of first specimens were introduced into the above-described saturation type super-accelerating life tester, and were left therein at a saturated vapor temperature of 105° C. for 4 hours. After removing the first specimens from the saturation type super-accelerating life tester, the first specimens were naturally dried indoors for seven days. Then, in accordance with the above-described method, the wear amount of each of the first specimens (process time of 4 hours) was measured.

Remaining several ones of the plurality of first specimens were introduced into the above-described saturation type super-accelerating life tester, and were left therein at a saturated vapor temperature of 105° C. for 24 hours. Then, in accordance with the above-described method, the wear amount of the first specimen (process time of 24 hours) was measured.

Results are shown in Table 3. When the wear amount (process time of 4 hours) or the wear amount (process time of 24 hours) is not greatly increased as compared with the wear amount (process time of 0 hour), it can be said that the thermosetting polyurethane constituting the outermost circumferential polyurethane layer of the shoe press belt is unlikely to be deteriorated due to humidity and heat and is excellent in hydrolysis resistance.

<Evaluation of Compression Set>

Evaluations were made with respect to the compression set of the thermosetting polyurethanes constituting the outermost circumferential polyurethane layers of the shoe press belts of Examples 1 to 3 and Comparative Examples 1 to 3.

From each shoe press belt having the outer circumferential surface provided with the drainage grooves, a second specimen (diameter of 35 mm; thickness of 6.0 mm; drainage grooves (10 lands/inch; width of 0.9 mm; depth of 1.0 mm) was produced using a punch. Then, the VV of the grooves of the second specimen (before compression) was determined.

A heating/compression jig is attached to a universal compression tensile tester (trademark "Autograph AG-50kNI" provided by Shimadzu Corporation) to apply a load of 6.0 MPa to the second specimen at 70° C. for 17 hours. Then, the second specimen was settled indoors, and the VV of the grooves of the second specimen (after compression) was determined after seven days. The retention ratio of the VV of the grooves was determined in accordance with the following formula.

[Retention ratio of VV of grooves](%)=[VV of grooves(after compression)]/[VV of grooves (before compression)]×100.

Results are shown in Table 3. A higher retention ratio of the VV of the grooves represents a smaller compression set of the thermosetting polyurethane constituting the outermost circumferential polyurethane layer of the shoe press belt. Hence, it can be said that collapse and chipping of a land are prevented.

<Evaluation of Occurrence of Crack>

Evaluations were made with respect to whether or not a crack was generated in the outermost circumferential polyurethane layer of the shoe press belt of each of Examples 1 to 3 and Comparative Examples 1 to 4.

The shoe press belt having the outer circumferential surface provided with no drainage grooves was cut, thereby producing a third specimen (length of 150 mm; width of 20 mm; thickness of 6.0 mm) in the form of a strip. Then, A De Mattia type bending tester described in JIS K6260-2010 (Rubber, vulcanized or thermoplastic—Determination of flex cracking and crack growth (De Mattia type)) was used to evaluate occurrence of cracks under the following condition: for reciprocating movement, the maximum distance was 80.5 mm, the minimum distance was 38.5 mm, and the movement distance was 42.0 mm. Under this condition, the bending test was performed (5 million times at maximum) until a crack is generated in the surface of the third specimen.

Results are shown in Table 3. In Table 3, ">500" means that even when the third specimen was bent 5 million times, no crack was generated in the third specimen. Therefore, it can be said that a crack is unlikely to be generated in the outermost circumferential polyurethane layer of the shoe press belt when the number of bending is >500 (×10,000 times).

<Evaluation of Development of Crack>

Evaluations were made with respect to development of a crack in the outermost circumferential polyurethane layer of the shoe press belt of each of Examples 1 to 3 and Comparative Examples 1 to 4.

The shoe press belt having the outer circumferential surface provided with no drainage grooves was cut into a strip-like shape, thereby producing a fourth specimen (length of 150 mm; width of 20 mm; thickness of 6.0 mm). The above-described De Mattia type bending tester was used to evaluate development of crack under the following condition: for reciprocating movement, the maximum distance was 80.5 mm, the minimum distance was 38.5 mm, and the movement distance was 42.0 mm. A notch having a length of 3.5 mm and a depth of 2.0 mm was provided in the outer surface of the fourth specimen at the center of the fourth specimen in the length direction of the fourth specimen and at one end in the width direction of the fourth specimen. Under this condition, the fourth specimen was bent until the tip of the crack reached a vicinity of the center of the fourth specimen in the width direction, and then the size of the crack and the number of times of bending were measured. The size of the measured crack was divided by the number of times of bending (1000 times) to determine a crack development rate.

Results are shown in Table 3. It can be said that with a lower crack development rate, the development of the crack is prevented in the outermost circumferential polyurethane layer of the shoe press belt.

<Analysis>

In Comparative Example 1, the thermosetting polyurethane constituting the outermost circumferential polyurethane layer of the shoe press belt was inferior in hydrolysis resistance and had a low retention ratio of the VV of the grooves. Therefore, it can be said that the collapse or chipping of the land is likely to take place. Moreover, a crack was generated in the outermost circumferential polyurethane layer of the shoe press belt when the number of bending is ≤500 (×10,000 times). Furthermore, the crack development rate was high. A similar result was obtained also in Comparative Example 3 except that a crack was not generated in the outermost circumferential polyurethane layer of the shoe press belt when the number of times of bending is ≤500 (×10,000 times).

In each of Comparative Examples 2 and 4, a crack was generated at a very early timing as compared with Examples 1 to 3, and the crack development rate was remarkably high.

On the other hand, in each of Examples 1 to 3, the thermosetting polyurethane constituting the outermost circumferential polyurethane layer of the shoe press belt was excellent in hydrolysis resistance and had a high retention ratio of the VV of the grooves. Therefore, it can be said that the collapse or chipping of the land is unlikely to take place. Moreover, no crack was generated in the outermost circumferential polyurethane layer of the shoe press belt when the number of bending is ≤500 (×10,000 times). Further, the crack development rate was very low.

In each of Examples 2 and 3 in which the number average molecular weight of the aliphatic polycarbonatediol was 2000, the crack development rate was further lower than that in Example 1.

The embodiments disclosed herein are illustrative and are not limited only to the description above. The scope of the present invention is defined by the terms of the claims, and is intended to include any modifications within the scope and meaning equivalent to the terms of the claims.

REFERENCE SIGNS LIST

1: press roll; 2: shoe press belt; 3: felt; 4: wet paper web; 5: pressure applying shoe; 21: base fabric; 23: inner polyurethane layer; 25: intermediate polyurethane layer; 27: outermost circumferential polyurethane layer; 29: drainage groove.

The invention claimed is:

1. A shoe press belt comprising a polyurethane in which a reinforcement base member is embedded, the polyurethane being in one piece with the reinforcement base member,
   the polyurethane constituting at least an outer circumferential surface of the shoe press belt being a thermosetting polyurethane obtained by curing an urethane prepolymer using a curing agent,
   the urethane prepolymer including at least one urethane prepolymer obtained by a reaction between an aromatic diisocyanate and a polyol component containing an aliphatic polycarbonatediol, which is obtained by a reaction between a carbonate and a mixture of 1,5-pentanediol and 1,6-hexanediol, wherein
   the curing agent contains 1,4-butanediol,
   the aliphatic polycarbonatediol has a number average molecular weight of 1300 to 2000, and
   the aromatic diisocyanate contains MDI at a NCO % of 8.35 to 9.13% relating to the aliphatic polycarbonatediol.

2. The shoe press belt according to claim 1, wherein the urethane prepolymer is a mixture of two or more types of urethane prepolymers having different compositions, and contains not less than 50 mass % of the at least one urethane prepolymer.

3. The shoe press belt according to claim 1, wherein a drainage groove is formed in the outer circumferential surface.

* * * * *